US009405856B2

(12) United States Patent
Marantz et al.

(10) Patent No.: US 9,405,856 B2
(45) Date of Patent: Aug. 2, 2016

(54) TASK-ORIENTED QUERY-COMPLETION SUGGESTIONS WITH SHORTCUTS

(75) Inventors: Daniel Marantz, Bellevue, WA (US); Brian Whalen MacDonald, Bellevue, WA (US); Jeffrey R. Kelleran, Sammamish, WA (US); Derrick L. Connell, Seattle, WA (US); Samir Shiraz Pradhan, Bellevue, WA (US); Sanaz Ahari, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 35 days.

(21) Appl. No.: 13/341,271

(22) Filed: Dec. 30, 2011

(65) Prior Publication Data

US 2013/0173650 A1 Jul. 4, 2013

(51) Int. Cl.
*G06F 17/30* (2006.01)

(52) U.S. Cl.
CPC ...... *G06F 17/3097* (2013.01); *G06F 17/30864* (2013.01); *G06F 17/30389* (2013.01); *G06F 17/30463* (2013.01)

(58) Field of Classification Search
CPC . G06F 17/3064; G06F 17/3097; G06F 17/30; G06F 17/30389; G06F 17/30463
USPC .................................................. 707/721, 767
See application file for complete search history.

(56) References Cited

U.S. PATENT DOCUMENTS

| 7,487,145 | B1 | 2/2009 | Gibbs et al. |
| 7,676,460 | B2 | 3/2010 | Morgan |
| 7,747,639 | B2 | 6/2010 | Kasperski et al. |
| 8,122,011 | B1 * | 2/2012 | Garg et al. ................ 707/721 |
| 8,417,718 | B1 * | 4/2013 | Finkelstein ......... G06F 17/3097 707/767 |
| 8,423,538 | B1 * | 4/2013 | Sadikov ............ G06F 17/30389 707/706 |
| 8,583,675 | B1 * | 11/2013 | Haahr ............... G06F 17/30442 707/721 |
| 8,631,004 | B2 * | 1/2014 | Mishne et al. ................ 707/727 |
| 2007/0061317 | A1 | 3/2007 | Ramer et al. |
| 2008/0071740 | A1 * | 3/2008 | Jhala et al. ........................ 707/3 |
| 2008/0104037 | A1 * | 5/2008 | Bierner .............. 707/3 |
| 2010/0299343 | A1 * | 11/2010 | Ahari et al. .................. 707/759 |
| 2011/0208730 | A1 * | 8/2011 | Jiang ................. G06F 17/30864 707/727 |
| 2011/0289015 | A1 * | 11/2011 | Mei ....................... G06Q 10/04 705/347 |
| 2013/0117297 | A1 * | 5/2013 | Liu et al. ....................... 707/767 |

OTHER PUBLICATIONS

Baeza-Yates, et al., "Modern Information Retrieval", Published on: Feb. 14, 2011, Available at: http://grupoweb.upf.es/WRG/mir2ed/pdf/chapter2.pdf.
Jain, et al., "Organizing Query Completions for Web Search", In Proceedings of the 19th ACM International Conference on Information and Knowledge Management, Oct. 26-30, 2010, 10 pages.

(Continued)

*Primary Examiner* — Tony Mahmoudi
*Assistant Examiner* — Merilyn Nguyen
(74) *Attorney, Agent, or Firm* — Dave Ream; Tom Wong; Micky Minhas (57) ABSTRACT

Systems, methods, and computer-readable storage media for providing task-oriented query-completion suggestions are provided. A portion of a search query is received, for instance, via a query-input region or search box presented in association with a general web search domain. As the portion of the search query is received, it is determined that the received search query portion is suggestive of a task-oriented user intent. Also determined are query-completion suggestions that are associated with the task-oriented user intent of which the search query portion is suggestive. The determined query-completion suggestions are then provided to the user. As query-completion suggestions are surfaced with input of short character sequences that are associated with task-oriented user intents, users can quickly be provided the relevant, rich content for completing their intended tasks.

20 Claims, 6 Drawing Sheets

(56) References Cited

OTHER PUBLICATIONS

"Search Provider Extensibility in Internet Explorer", Retrieved on: Jun. 7, 2011, Available at: http://msdn.microsoft.com/en-us/library/cc848862(v=vs.85).aspx.

"Bing Autosuggest—Keeping You Current", Retrieved on: Jun. 7, 2011, Available at: http://www.bing.com/community/site_blogs/b/search/archive/2010/01/19/bing-autosuggest-keeping-you-current.aspx.

* cited by examiner

NEWS

- NEWS
- NEW YORK CITY MARATHON
- NEW YORK TIMES
- NEW YORK POST
- NEWEGG
- NEWGROUNDS
- NEW YORK LOTTERY
- NEW YORK DAILY NEWS
- NEW

NEWS HEADLINES
HOUSE DEMOCRATS FAIL TO WIPE THE LEADERSHIP CLEAN
WASHINGTON-REPUBLICANS, AFTER PICKING UP 61 HOUSE SEATS, 6 SENATE SPOT, 7 NEW GOVERN... NEW YORK TIMES – 30 MINUTES AGO
RELATED ARTICLES
FRANCESCO MOLINARI SPOILS LEE WE... MINNEAPOLIS STAR
ARTICLES
QANTAS SAFETY REPUTATION 'HALO' SLIP... BLOOMBERG

LAME DUCK DEMS STILL CBS NEWS | AIRPLANES ENGINES REUTERS | ELECTION BATTLES: ABC NEWS | WEEKLY ADDRESS: AP VIDEO

# TASK-ORIENTED QUERY-COMPLETION SUGGESTIONS WITH SHORTCUTS

BACKGROUND

The Internet, through its billions of Web pages, provides a vast and quickly growing library of information and resources. In order to find desired content, computer users often make use of search utilities. Exemplary Internet search engines are well known in the art, for instance, a commonly known commercial engine is the Bing® search engine provided by Microsoft Corporation of Redmond, Wash. In an attempt to ensure users are providing a query that will prove most useful in retrieving the results they desire, many search utilities offer query-completion suggestions as the user inputs a partial search query. Upon selection of a particular query-completion suggestion, the selected query-completion suggestion is searched against the general Web search domain and results are provided to the user in the form of a search engine results page presented in association with the general Web search domain (e.g., www.bing.com). As user search queries are not structured, query-completion suggestions are generally determined utilizing keyword matching techniques. However, users often do not provide the ultimate intent of their queries in the characters input as the query. For instance, a user desiring directions to WAL-MART, may begin to input the characters "WAL-" as a query. A query-completion suggestion of "WAL-MART" may be provided to the user based upon this partial query. However, since location and directions were the real intent of the query, it is unlikely that a query-completion suggestion will be provided that directly provides such information to the user. Thus, this type of keyword matching for providing query-completion suggestions can lead to refining, re-querying and time lost searching for Web results with the right content to complete a user's intended task.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments of the present invention relate to systems, methods, and computer-readable storage media for, among other things, permitting users to express an action-intent or task-intent via an input search query and providing task-oriented query-completion suggestions as the task-intent is being input. At least a portion of a general web search query is received. The query portion may be received, for instance, via a query-input region or search box presented in association with a general web search domain (e.g., www.bing.com, www.google.com, or the like). As the portion of the general web search query is received, it is determined that the received search query portion is suggestive of a task-oriented user intent. Also determined are query-completion suggestions (that is, suggested complete queries or structured query refinements determined based upon the query portion input) that are associated with the task-oriented user intent of which the search query portion is suggestive. The determined query-completion suggestions are then provided to the user. As relevant query-completion suggestions are surfaced with input of short character sequences that are associated with task-oriented user intents, users can quickly be provided the relevant, rich content desired for completing their intended tasks.

BRIEF DESCRIPTION OF THE DRAWINGS

The present invention is illustrated by way of example and not limitation in the accompanying figures in which like reference numerals indicate similar elements and in which.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various aspects of the technology described herein are generally directed to systems, methods, and computer-readable storage media for, among other things, permitting users to express an action-intent or task-intent via an input search query and providing task-oriented query-completion suggestions as the task-intent is being input. At least a portion of a general web search query is received. The query portion may be received, for instance, via a query-input region or search box presented in association with a general web search domain (e.g., www.bing.com, www.google.com, or the like). As the portion of the general web search query is received, it is determined that the received search query portion is suggestive of a task-oriented user intent. Such may be determined, for instance, by mining query log data to determine that particular character sequences that may be input as a search query often result in particular user tasks ultimately being performed. Also determined are query-completion suggestions (that is, suggested complete queries or structured query refinements determined based upon the query portion input) that are associated with the task-oriented user intent of which the search query portion is suggestive. The determined query-completion suggestions are then provided to the user. Such query-completion suggestions are generally provided in a preview window overlaying the webpage from which the search query is input and may, for instance, be provided in association with the query-input region. As relevant query-completion suggestions are surfaced upon input of short character sequences, the query-completion suggestions being that are associated with task-oriented user intents, users inputting such sequences as search queries (or portions thereof) can quickly be provided the relevant, rich content desired for completing their intended tasks.

Accordingly, one embodiment of the present invention is directed to one or more computer-readable storage media storing computer-useable instructions that, when used by one or more computing devices, cause the one or more computing devices to perform a method for providing task-oriented query-completion suggestions. The method includes receiving at least a portion of a search query, determining the received search query portion is suggestive of a task-oriented user intent, and providing at least one query-completion suggestion that is associated with the task-oriented user intent of which the received search query portion is suggestive.

Another embodiment of the present invention is directed to a method performed by a computing device having at least one processor, for providing query-completion suggestions associated with task-oriented user actions. The method includes mining query logs to identify a plurality of task-oriented user actions; identifying a plurality of character sequences, each representing a shortcut to at least one query-completion suggestion that is associated with one of the plurality of task-oriented user actions; and mapping each of the plurality of character sequences to one of the at least one query-completion suggestions that is associated with the one of the plurality of task-oriented user actions represented thereby such that upon receipt of one of the plurality of character sequences as at least a portion of a search query, the respective at least one query-completion suggestion is provided as a suggestion to complete the received search query portion.

In yet another embodiment, the present invention is directed to a system for providing task-oriented query-completion suggestions. The system includes a computing device associated with a search engine having one or more processors and one or more computer-readable storage media and a data store coupled with the search engine. The search engine is configured to receive at least a portion of a search query in association with a query-input region of a screen display, mine query log data to determine the received search query portion is suggestive of a task-oriented user intent; and provide at least one query-completion suggestion that is associated with the task-oriented user intent for which the received search query portion is suggestive in association with the query-input region.

Having briefly described an overview of embodiments of the present invention, an exemplary operating environment in which embodiments of the present invention may be implemented is described below in order to provide a general context for various aspects of the present invention. Referring to the figures in general and initially to FIG. 1 in particular, an exemplary operating environment for implementing embodiments of the present invention is shown and designated generally as computing device 100. The computing device 100 is but one example of a suitable computing environment and is not intended to suggest any limitation as to the scope of use or functionality of embodiments of the invention. Neither should the computing device 100 be interpreted as having any dependency or requirement relating to any one or combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules including routines, programs, objects, components, data structures, and the like, refer to code that performs particular tasks or implements particular abstract data types. Embodiments of the invention may be practiced in a variety of system configurations, including hand-held devices, consumer electronics, general-purpose computers, more specialty computing devices, etc. Embodiments of the invention may also be practiced in distributed computing environments where tasks are performed by remote-processing devices that are linked through a communications network.

Figure 1:
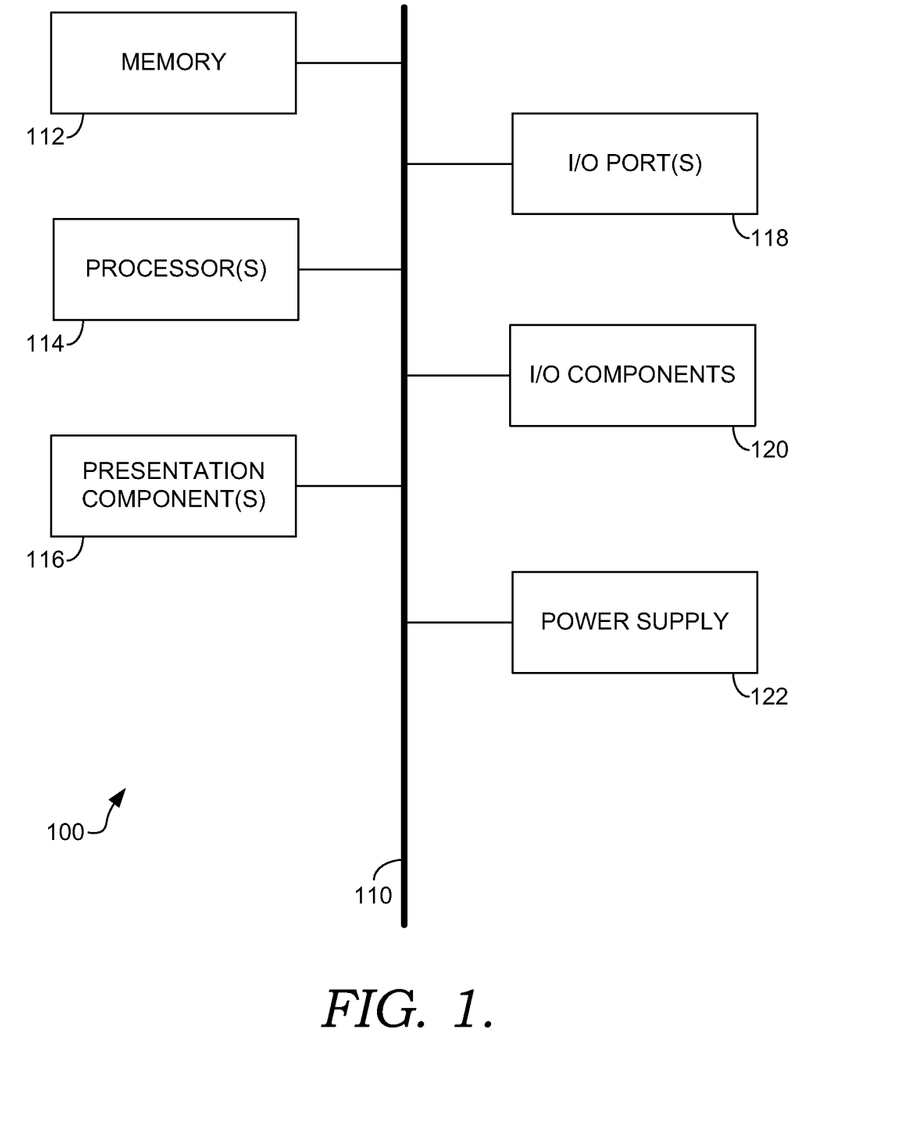
FIG. 1 is a block diagram of an exemplary computing environment suitable for use in implementing embodiments of the present invention.

With continued reference to FIG. 1, the computing device 100 includes a bus 110 that directly or indirectly couples the following devices: a memory 112, one or more processors 114, one or more presentation components 116, one or more input/output (I/O) ports 118, I/O components 120, and an illustrative power supply 122. The bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

The computing device 100 typically includes a variety of computer-readable media. Computer-readable media can be any available media that can be accessed by the computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Combinations of any of the above are also included within the scope of computer-readable media.

The memory 112 includes computer-storage media in the form of volatile and/or nonvolatile memory. The memory may be removable, non-removable, or a combination thereof. Exemplary hardware devices include solid-state memory, hard drives, optical-disc drives, and the like. The computing device 100 includes one or more processors that read data from various entities such as the memory 112 or the I/O components 120. The presentation component(s) 116 present data indications to a user or other device. Exemplary presentation components include a display device, speaker, printing component, vibrating component, and the like.

The I/O ports 118 allow the computing device 100 to be logically coupled to other devices including the I/O components 120, some of which may be built in. Illustrative components include a microphone, joystick, game pad, satellite dish, scanner, printer, wireless device, and the like.

As previously mentioned, embodiments of the present invention are generally directed to systems, methods, and computer-readable storage media for, among other things, permitting users to express an action-intent or task-intent via an input search query and providing task-oriented query-completion suggestions as the task-intent is being input. At least a portion of a general web search query is received. The query portion may be received, for instance, via a query-input region or search box presented in association with a general web search domain. As the portion of the general web search query is received, it is determined that the received search query portion is suggestive of a task-oriented user intent. Also determined are query-completion suggestions that are associated with the task-oriented user intent of which the search query portion is suggestive. The determined query-completion suggestions are then provided to the user. As relevant query-completion suggestions are surfaced with input of short character sequences that are associated with task-oriented user intents, users can quickly be provided the relevant, rich content desired for completing their intended tasks.

Figure 2:
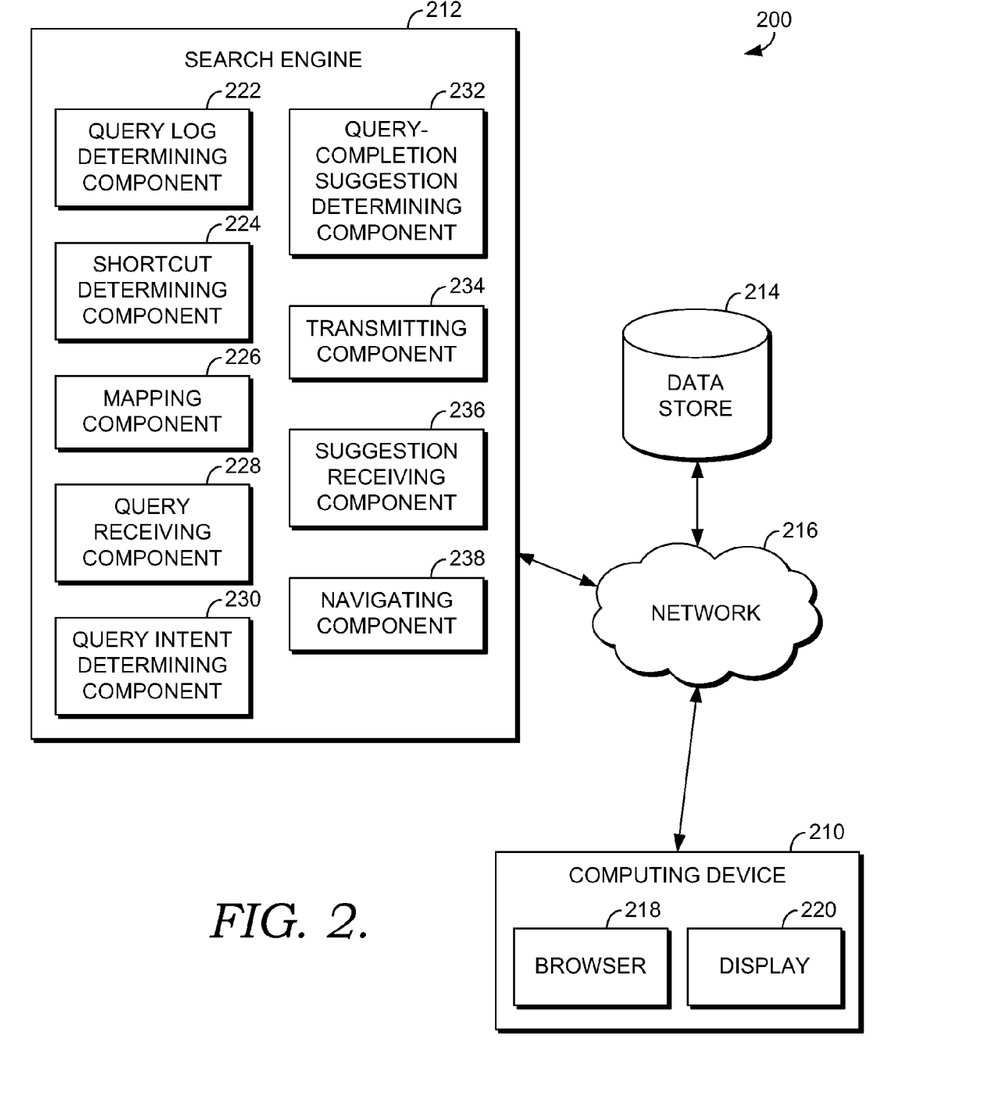
FIG. 2 is a block diagram of an exemplary computing system in which embodiments of the invention may be employed.

Referring now to FIG. 2, a block diagram is provided illustrating an exemplary computing system 200 in which embodiments of the present invention may be employed. Generally, the computing system 200 illustrates an environment in which task-oriented query-completion suggestions may be provided. As will be described in further detail below, embodiments of the present invention provide systems and methods for permitting users to express an action-intent or task-intent via an input search query and providing query-completion suggestions that are associated with particular user tasks as the task-intent is being input. In this way, the system is configured to provide relevant query-completion suggestions upon input of short character sequences that are associated with task-oriented user intents such that users can quickly be provided the relevant, rich content for completing their intended tasks.

Among other components not shown, the computing system 200 generally includes a client computing device 210, a search engine 212, and a data store 214, all in communication with one another via a network 216. The network 216 may include, without limitation, one or more local area networks (LANs) and/or wide area networks (WANs). Such networking environments are commonplace in offices, enterprise-wide computer networks, intranets and the Internet. Accordingly, the network 216 is not further described herein.

It should be understood that any number of client computing devices, search engines and data stores may be employed in the computing system 200 within the scope of embodiments of the present invention. Each may comprise a single device/interface or multiple devices/interfaces cooperating in a distributed environment. For instance, the search engine 212 may comprise multiple devices and/or modules arranged in a distributed environment that collectively provide the functionality of the search engine 212 described herein. Additionally, other components/modules not shown also may be included within the computing system 200.

In some embodiments, one or more of the illustrated components/modules may be implemented as stand-alone applications. In other embodiments, one or more of the illustrated components/modules may be implemented via the computing device 210, as an Internet-based service, or as a module inside the search engine 212. It will be understood by those of ordinary skill in the art that the components/modules illustrated in FIG. 2 are exemplary in nature and in number and should not be construed as limiting. Any number of components/modules may be employed to achieve the desired functionality within the scope of embodiments hereof. Further, components/modules may be located on any number of search engines or user computing devices. By way of example only, the search engine 212 might be provided as a single server (as shown), a cluster of servers, or a computing device remote from one or more of the remaining components.

It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client computing device 210 may include any type of computing device, such as the computing device 100 described with reference to FIG. 1, for example. Generally, the client computing device 210 includes a browser 218 and a display 220. The browser 218 is configured to render web pages, for instance, search engine home pages and search engine results pages, in association with the display 220 of the client computing device 210. The browser 218 is further configured to receive user input of requests for various web pages (including search engine home pages and results pages), receive user inputted search queries (generally inputted via a user interface presented on the display 220 and permitting alpha-numeric and/or textual input into a designated query-input region) and to receive content for presentation on the display 220, for instance, from the search engine 212. The browser 218 may be any suitable type of Web browser such as Internet Explorer®, Firefox®, Chrome®, Safari®, or other type of software configured to enable submission of search queries as disclosed herein. It should be noted that the functionality described herein as being performed by the browser 218 may be performed by any other application capable of rendering Web content. Any and all such variations, and any combination thereof, are contemplated to be within the scope of embodiments of the present invention.

The display 220 is configured to present various content including, without limitation, browser home pages and/or search engine home pages having a query-input region, query-completion suggestions (for instance, in association with a query-input region) and search engine results pages, as described herein. In embodiments, the display 220 is further configured to enable touch inputs from a user.

The search engine 212 is configured to receive and respond to requests that it receives from components associated with client computing devices, for instance, the browser 218 associated with the client computing device 210. Those skilled in the art of the present invention will recognize that the present invention may be implemented with any number of searching utilities. For example, an Internet search engine or a database search engine may utilize the present invention. These search engines are well known in the art, and commercially available engines share many similar processes not further described herein.

As illustrated, the search engine 212 includes a query log mining component 222, a shortcut determining component 224, a mapping component 226, a query receiving component 228, a query intent determining component 230, a query-completion suggestion determining component 232, a transmitting component 234, a suggestion receiving component 236 and a navigating component 238. The illustrated search engine 212 also has access to a data store 214. The data store 214 is configured to store information pertaining to search queries and any associated user tasks. In various embodiments, such information may include, without limitation, search query logs containing information regarding input search queries and destinations and/or actions facilitated thereby, shortcut character sequences representing suggested query-completion suggestions, and query-completion suggestions with associated task-oriented user intents. In embodiments, the data store 214 is configured to be searchable for one or more of the items stored in association therewith. It will be understood and appreciated by those of ordinary skill in the art that the information stored in association with the data store 214 may be configurable and may include any information relevant to search queries, task-oriented query-completion suggestions, and task-oriented user intents. The content and volume of such information are not intended to limit the scope of embodiments of the present invention in any way. Further, though illustrated as a single, independent component, the data store 214 may, in fact, be a plurality of storage devices, for instance a database cluster, portions of which may reside in association with the search engine 212, the client computing device 210, another external computing device (not shown), and/or any combination thereof.

The query log mining component 222 of the search engine 212 is configured to mine query logs to identify task-oriented user actions that are associated with particular input search queries (or portions thereof). That is, the query log mining component 222 is configured to mine query log data to determine particular character sequences that may be input as a search query (or portion thereof) and that ultimately result in particular user tasks being performed, often enough against the scope of all input search queries, to be indicative of a significant correlation. For instance, a significant number of users desiring directions to WAL-MART, may begin to input the characters "WAL-" as a search query. If it is determined that upon input of the character sequence "WAL-" a significant number of users ultimately drill down into a webpage associated with WAL-MART to determine directions, the task-oriented user action of determining directions to WAL-MART may be identified as associated with that character sequence. The query log mining component 222 may also engage in query pattern analysis to determine task-oriented user actions associated with particular input search queries. Additionally, the mined information may be analyzed and/or input editorially (manually), as desired. Any and all such variations, and any combination thereof, are contemplated to be within the scope of embodiments of the present invention.

The shortcut determining component 224 is configured to determine, from the identified character sequences, sequences that are desired as shortcuts to query-completion suggestions that are associated with the relevant task-oriented user intents. That is, the shortcut determining component 224 is configured to determine those identified character sequences that, upon input as a search query, will cause query-completion suggestions associated with the relevant task-oriented user intents to be surfaced. Again, shortcuts may be analyzed and/or input editorially (manually) as desired.

The mapping component 226 is configured to map the identified character sequences and the relevant task-oriented user intents to one another and to store such information in an index, for instance, in association with the data store 214.

The following table provides an exemplary index portion that may be created by the interaction between the query log mining component 222, the shortcut determining component 224 and the mapping component 226:

| Identified Character Sequence (Shortcut) | Query-Completion Suggestion(s) | Task-Oriented User Intent(s) |
|---|---|---|
| di, dic, dict | Dictionary | Dictionary.com Dcard |
| | | Dictionary Supplemental Result |
| ev, eve, even | Events | Events Supplemental Result |
| fl, fli, flig | Flights | Flights Supplemental Result |
| ga, gam, game | Games | Games Supplemental Result |
| ma, map, maps | Maps | Maps Supplemental Result |
| mo, mov, movi | Movies | Show Times Supplemental Result |
| ne, new, news | News | News Supplemental Result |
| on, onl | Online Games | Online Games Supplemental Result |
| re, rec, reci | Recipes | Allrecipes.com Dcard |
| | | Recipes Supplemental Result |
| tr, tra, traf | Traffic | Traffic Supplemental Result |
| we, wea, weat | Weather | Weather Supplemental Result |
| ad, add, addi | Addicting Games | Addictinggames.com Dcard |
| | | Addicting Games Supplemental Result |
| fo, foo, food | Food & Recipes | Recipes Supplemental Result |
| nas, nasc | Nascar | Nascar.com Dcard |
| | | Nascar Supplemental Result |
| nb, nba | NBA | NBA.com Dcard |
| | | NBA Supplemental Result |
| nf, nfl | NFL | NFL.com Dcard |
| | | NFL Supplemental Result |

To create the illustrated table, the query log mining component 222, has mined query logs (for instance, stored in association with the data store 214) and determined that upon entry of the queries listed in the center column of the table, users often ultimately perform a task that is associated with the user-intent listed in the right column. The query log mining component 222 has also determined that such happens often enough to be considered significant against the scope of all input search queries. The shortcut determining component 224 has then determined that the character sequences listed in the left column often results in the ultimate input or selection of the queries represented in the center column. Thus, the shortcut determining component 224 has determined that the listed character sequences represent shortcuts for the associated queries. The mapping component 226 accordingly has mapped the listed character sequences in the left column to the user intents in the right column such that when a user inputs the listed character sequences as a partial query, the query-completion suggestion in the center column is surfaced and, upon selection thereof, the user is navigated to the experience associated with the listed user-intent, as more fully described below.

A couple of items are worthy of note. First, while many of the character sequences that represent shortcuts for the listed query-completion suggestions are prefixes of the query-completion suggestions, such is not necessary. For instance, it may be that the character sequence "foo" often represents the query "recipes" rather than "food & recipes" as listed. Second, the term "supplemental result" in the right column is indicative of an answer to a query that is determined independent of algorithmically-derived search results. That is, such is intended to represent information presented, for instance, in association with "www.bing.com" as an "instant answer" which is determined through a structured data pipeline and associated with a set of structured data and a rich presentation compared to Web search results.

Figure 3:
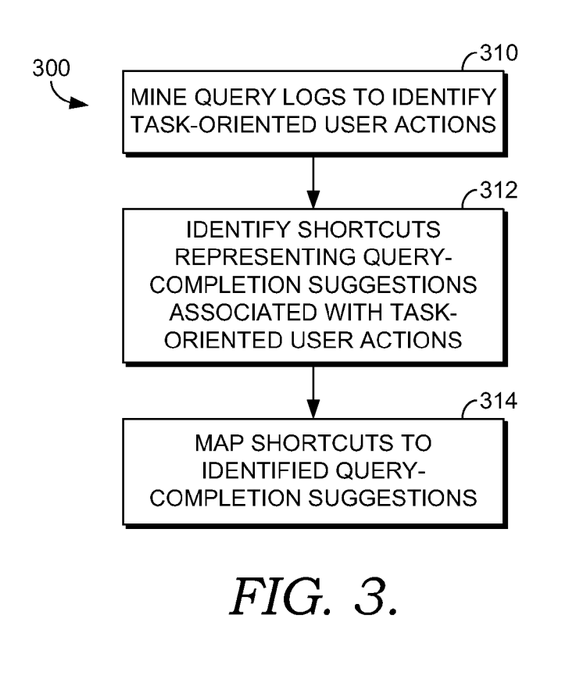
FIG. 3 is a flow diagram showing an exemplary method for providing query-completion suggestions associated with task-oriented user actions, in accordance with an embodiment of the present invention.

Turning now to FIG. 3, a flow diagram is illustrated showing an exemplary method 300 for providing query-completion suggestions associated with task-oriented user actions, in accordance with an embodiment of the present invention. Initially, as indicated at block 310, query logs are mined to identify task-oriented user actions (for instance, utilizing the query log mining component 222 of FIG. 2). Character sequences representing shortcuts to query-completion suggestions are then identified, as indicated at block 312 (for instance, utilizing the shortcut determining component 224 of FIG. 2). Each query-completion suggestion is associated with one of the identified task-oriented user actions. As indicated at block 314, each of the identified character sequences is mapped to one of the query-completion suggestions such that upon receipt of the relevant character sequence as a portion of a search query, the relevant query-completion suggestion is provided as a suggestion to complete the received search query portion. This may be performed, for instance, utilizing the mapping component 226 of FIG. 2.

With reference back to FIG. 2, the query receiving component 228 of the search engine 212 is configured to receive search queries and/or portions thereof, for instance, search queries input via the client computing device 210. An input search query may include, by way of example only, alphanumeric and/or textual input. In embodiments, the query receiving component 228 receives a search query and/or a portion thereof that has been input in association with a query-input region (e.g., a search box) presented in association with a display (e.g., the display 220 of the client computing device 210).

The query intent determining component 230 is configured to determine that a received search query portion is suggestive of a task-oriented user intent. Such may be determined, for instance, by the query intent determining component 230 communicating with the data store 214 to consult an index, such as the table index described herein above.

The query-completion suggestion determining component 232 is configured to determine one or more query-completion suggestions for the received search query or portion thereof. Query-completion suggestions are suggested complete queries or structured query refinements determined based upon query volumes and the like, that are associated with an input query portion. For instance, if a user inputs the query portion "ne," a query-completion suggestion of "News" may be provided. Similarly, if a user inputs the query portion "wea," a query-completion suggestion of "Weather" may be provided. Query-completion suggestions determined in accordance with the system 200 hereof are associated with task-oriented user intents. For instance, the query-completion suggestion "News" may be associated with the user intent to review the day's news headlines. Similarly, the query-completion suggestion "Weather" may be associated with the user intent to review the local weather forecast for the current day and the subsequent day.

The transmitting component 234 is configured to transmit any determined query-completion suggestions for presentation on a computing device associated with the received search query, for instance, the user computing device 210. Generally, such transmission is configured for presentation in association with a query-input region associated with the received search query, as more fully described below with reference to FIGS. 4, 5 and 6.

The suggestion receiving component 236 is configured to receive selection of presented query-completion suggestions. The navigating component 238 is configured to navigate the user to the experience associated with the selected query-completion suggestion upon selection thereof. Depending upon the nature of the query-completion suggestion, such navigation may be to a vertical associated with a search engine for furtherance of the task-oriented user intent, an external source (e.g., a third party website) for furtherance of the task-oriented user intent, or to additional query-completion suggestion that can aid in refinement of the task-oriented user intent. Any and all such variations, and any combination thereof, are contemplated to be within the scope of embodiments of the present invention.

Figure 4:
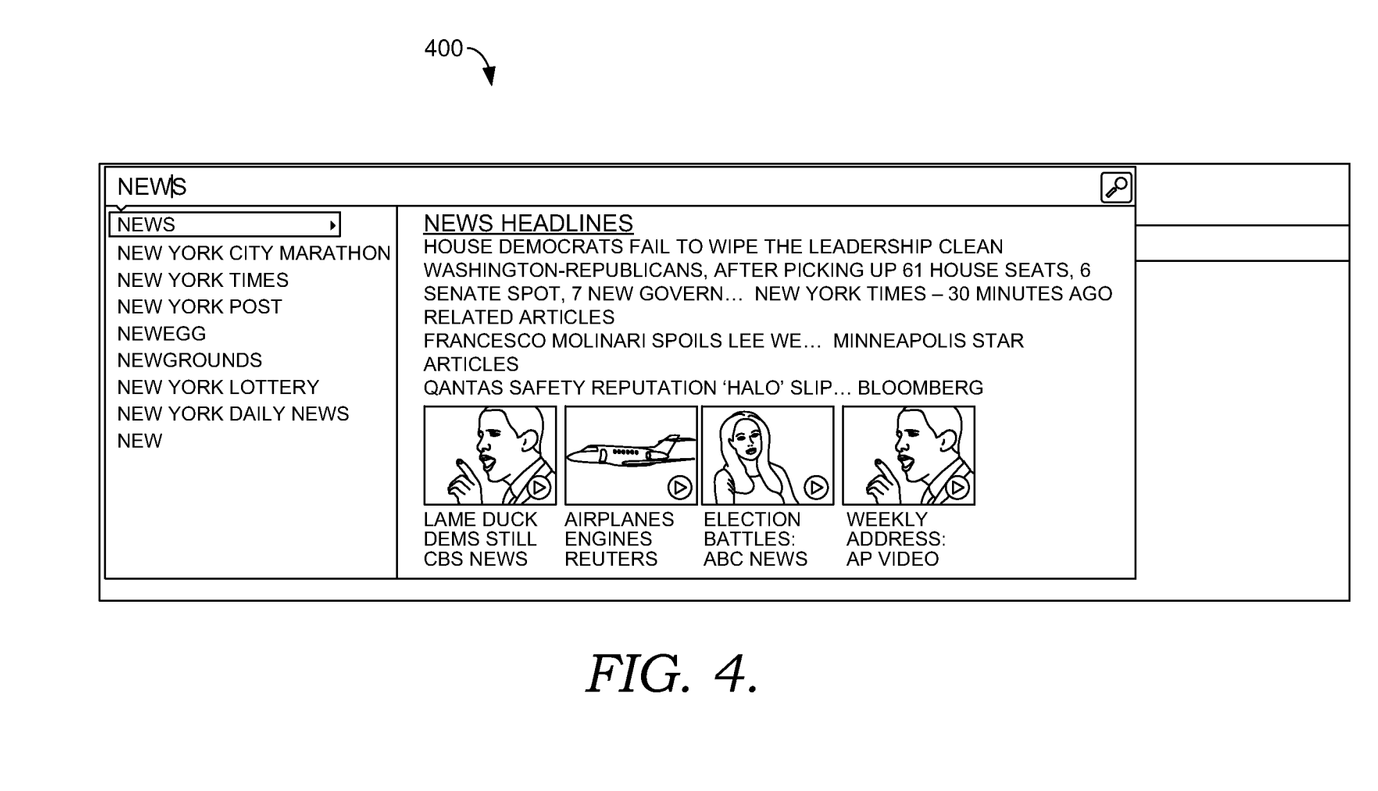
FIG. 4 is a schematic diagram illustrating an exemplary screen display of a task-oriented query-completion suggestion in association with a query-input region, in accordance with an embodiment of the present invention.

With reference to FIG. 4, a schematic diagram is shown illustrating an exemplary screen display 400 showing presentation of a task-oriented query-completion suggestion in association with a query-input region, in accordance with an embodiment hereof. In the illustrated example, the user has input the partial query "new." Standard query-completion suggestions determined in accordance with keyword-based techniques are provided by way of a list underneath the search input region (i.e., the search box). Also presented is at least one query-completion suggestion determined in accordance with embodiments hereof. In the illustrated example, presented is a supplemental result or "instant answer" associated with the query "news." In the illustrated embodiment, the character sequence "new" is representative of the query "news" and the query "news" is associated with the user intent to review the day's news headlines via a news instant answer or supplemental result. Note that the task-oriented query-completion suggestion (i.e., news answer) is presented in association with the query-input region. That is, the user has not been navigated away from the webpage from which the search query was entered but rather the task-oriented query-completion suggestion has been presented in a window overlaying the page from which the query was entered. In this way, if the user does not desire the news answer but rather was intending to inquire about the New York lottery, a different query-completion suggestion may be selected (or the user may continue typing his/her query) and the content in the overlay window will be modified accordingly. If, however, the user does desire to view the news answer presented, s/he may select the query completion suggestion "news" and be navigated to the webpage presented in the overlay window.

Figure 5:
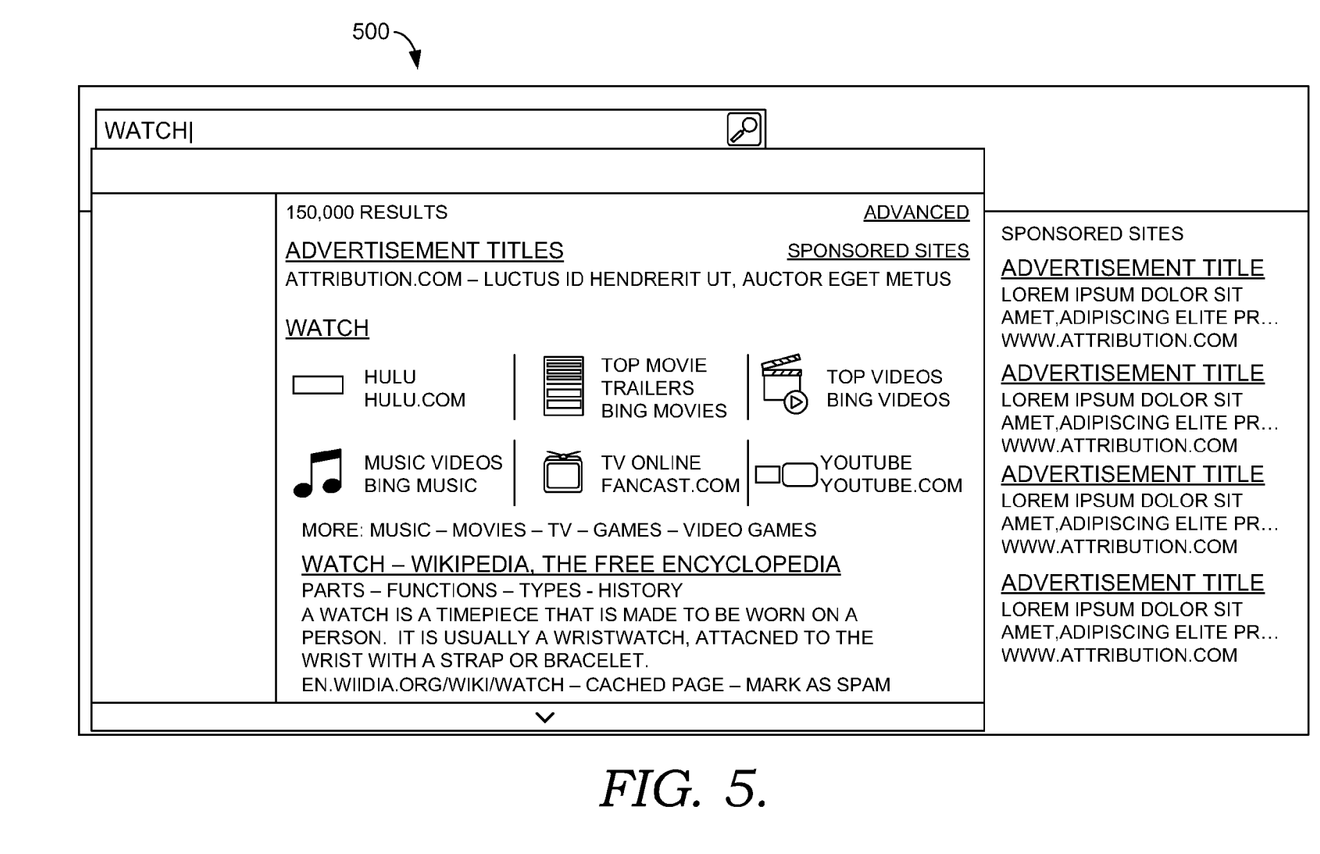
FIG. 5 is a schematic diagram illustrating an exemplary screen display of a task-oriented query-completion suggestion in association with a query-input region, in accordance with another embodiment of the present invention.

With reference to FIG. 5, a schematic diagram is shown illustrating another exemplary screen display 500 showing presentation of a task-oriented query-completion suggestion in association with a query-input region, in accordance with an embodiment of the present invention. In the illustrated example, the user has input the partial query "watch." Based upon the partial query input, it has been determined that the user desires to watch something (rather than, for instance, to purchase a watch). However, it is unknown what the user desires to watch. Accordingly, surfaced as query-completion suggestions are various items that are potential subjects for completion of the user query. For instance, the user may intend to watch HULU or the top videos associated with the search engine. In order to provide a more definitive query-completion suggestion to the user, more information is needed. As such, at least a portion of the presented items are intended to aid the user in quickly refining his or her search. As shown, the query refinement suggestions include visual indications that may be quickly and easily recognizable to the user. Also provided is an indication of whether the user will be navigated to a vertical associated with the search engine or to an external web site upon selection thereof. Again, the user may continue to input his or her query if none of the items shown represents the user's intent. As s/he continues to input the query, the content of the overlay window associated with the query-input region will change accordingly. Note that unless and until the user selects one of the presented items, the user is not navigated away from the webpage from which the search query was input.

Figure 6:
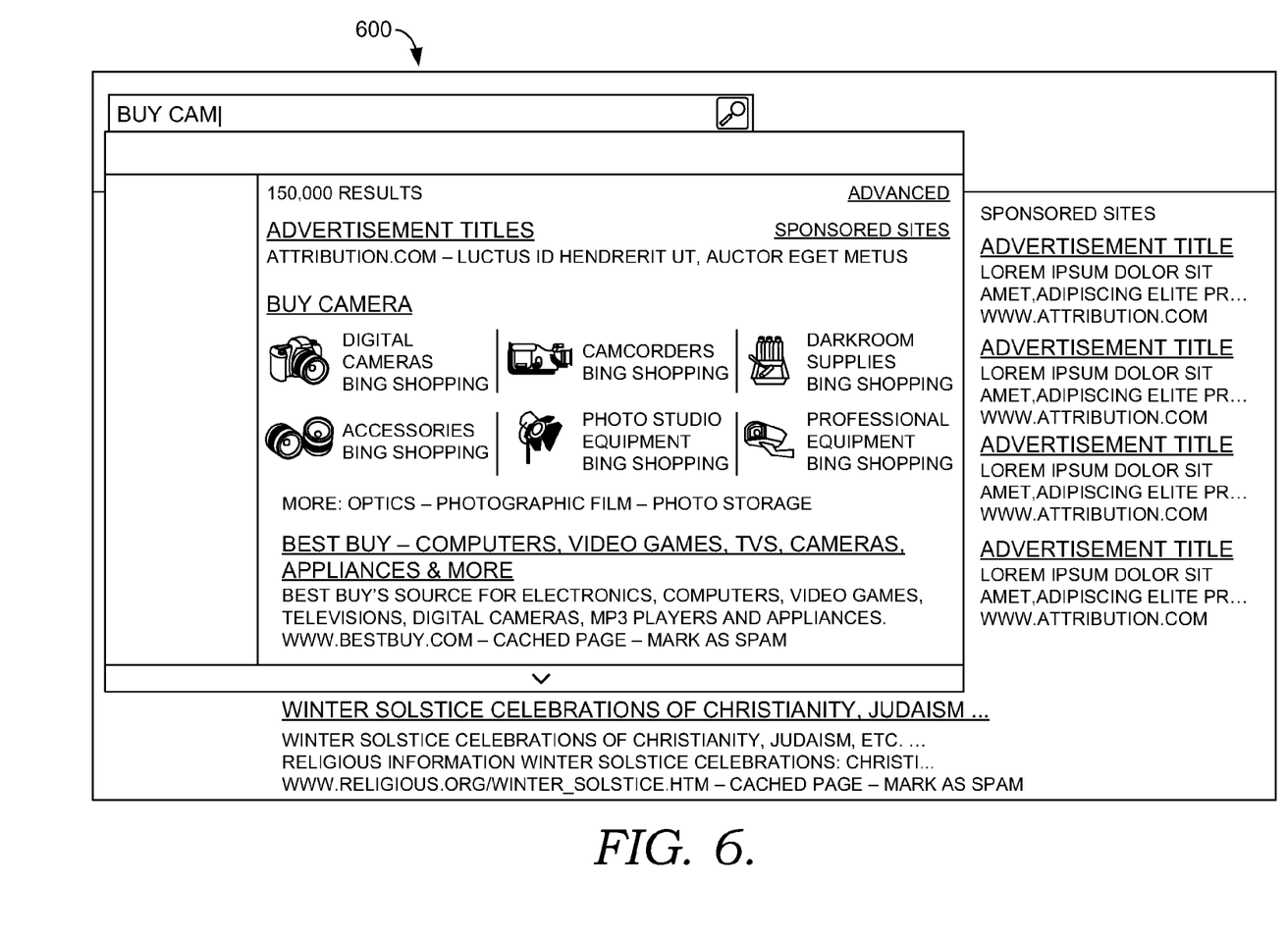
FIG. 6 is a schematic diagram showing an exemplary screen display of a task-oriented query-completion suggestion in association with a query-input region, in accordance with yet another embodiment of the present invention.

With reference to FIG. 6, a schematic diagram is shown illustrating an exemplary screen display 600 showing presentation of a task-oriented query-completion suggestion in association with a query-input region, in accordance with another embodiment of the present invention. In the illustrated example, the user has input the partial query "buy cam." Based upon the partial query input, it has been determined that the user desires to buy a camera. Based upon the items shown in response as query-completion suggestions, it can be seen that it has been determined that the partial query is a verb-based entry point into a shopping experience. Note that the query-completion suggestions do not necessarily even contain the characters input as the query and, accordingly, are likely to be different than any query-completion suggestions determined utilizing keyword-based techniques.

Figure 7:
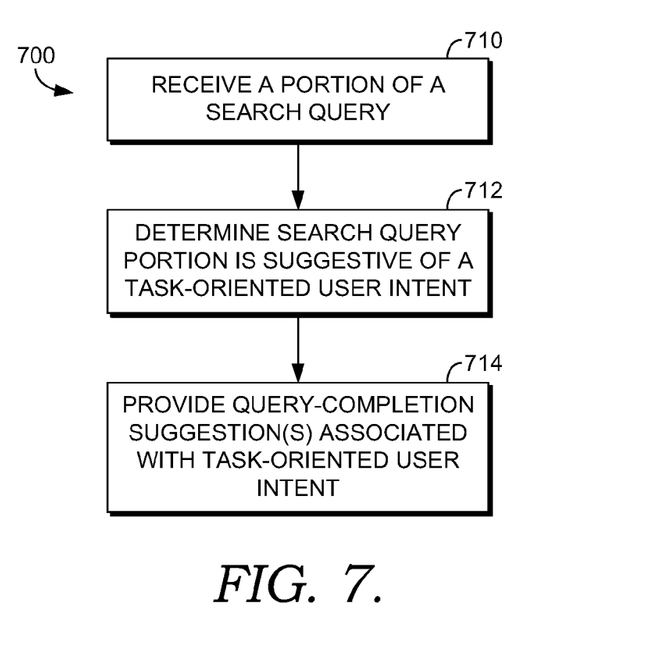
FIG. 7 is a flow diagram showing an exemplary method for providing query-completion suggestions associated with task-oriented user actions, in accordance with an embodiment of the present invention.

FIG. 7 is a flow diagram showing an exemplary method 700 for providing task-oriented query-completion suggestions, in accordance with an embodiment of the present invention. Initially, as indicated at block 710, at least a portion of a search query is received. As previously set forth, an input search query may include, by way of example only, alphanumeric and/or textual input. A search query (and/or a portion thereof) may be received upon user input in association with a query-input region (e.g., a search box) presented in association with a display (e.g., the display 220 of the client computing device 210). As indicated at block 712, it is determined that the received search query (or portion thereof) is suggestive of a task-oriented user intent (for instance, utilizing query intent determining component 230 of FIG. 2). As indicated at block 714, at least one query-completion suggestion is then provided that is represented by the search query portion and that is associated with the task-oriented user intent of which the received search query portion is suggestive.

As can be understood, embodiments of the present invention provide systems and methods for providing task-oriented query-completion suggestions. The present invention has been described in relation to particular embodiments, which are intended in all respects to be illustrative rather than restrictive. Alternative embodiments will become apparent to those of ordinary skill in the art to which the present invention pertains without departing from its scope.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

It will be understood by those of ordinary skill in the art that the order of steps shown in the method 300 of FIG. 3 and the method 700 of FIG. 7 are not meant to limit the scope of the present invention in any way and, in fact, the steps may occur in a variety of different sequences within embodiments hereof. Any and all such variations, and any combination thereof, are contemplated to be within the scope of embodiments of the present invention.

What is claimed is:

1. One or more hardware memory devices storing computer-useable instructions that, when used by one or more computing devices, cause the one or more computing devices to perform a method for providing task-oriented query-completion suggestions, the method comprising:
   receiving at least a portion of a search query;
   determining the received search query portion is suggestive of a task-oriented user intent, wherein the task-oriented user intent includes a user task that occurs subsequent to accessing search results and is an ultimate intent of the search query; and
   accessing a data store that stores associations between user tasks and query-completion suggestions;
   based on the determined user task, identifying one or more query-completion suggestions that are associated with the user task in the data store;
   providing at least one of the identified one or more query-completion suggestions that are associated with the user task of which the received search query portion is suggestive.

2. The one or more hardware memory devices of claim 1, wherein receiving the search query portion comprises receiving the search query portion in association with a query-input region,
   and wherein providing the at least one query-completion suggestion comprises providing the at least one query-completion suggestion in association with the query-input region.

3. The one or more hardware memory devices of claim 1, wherein determining the received search query portion is suggestive of the task-oriented user intent comprises mining query log data to determine the received search query portion is suggestive of the task-oriented user intent.

4. The one or more hardware memory devices of claim 1, wherein determining the received search query portion is suggestive of the task-oriented user intent comprises determining that the received search query portion is a shortcut representative of the task-oriented user intent.

5. The one or more hardware memory devices of claim 1, wherein providing the at least one query-completion suggestion that represents the suggested task-oriented user intent comprises providing a supplemental search result determined to satisfy the task-oriented user intent.

6. The one or more hardware memory devices of claim 1, wherein providing the at least one query-completion suggestion that represents the suggested task-oriented user intent comprises providing one or more selectable indicators each of which represents an actionable query-completion selection.

7. The one or more hardware memory devices of claim 6, wherein the method further comprises:
   receiving a user selection of one of the one or more selectable indicators; and,
   in response to the user selection of the one of the one or more selectable indicators, navigating the user to a vertical associated with a search engine for furtherance of the task-oriented user intent.

8. The one or more hardware memory devices of claim 6, wherein the method further comprises:
   receiving a user selection of one of the one or more selectable indicators; and, in response to the user selection of the one of the one or more selectable indicators, navigating the user to an external source for furtherance of the task-oriented user intent.

9. The one or more hardware memory devices of claim 6, wherein the method further comprises:
receiving a user selection of one of the one or more selectable indicators; and,
in response to the user selection of the one of the one or more selectable indicators, providing at least one additional selectable indicator which represents an actionable query-completion selection.

10. The one or more hardware memory devices of claim 6, wherein at least a portion of the one or more selectable indicators includes a visual indicator in association therewith that is indicative of the query-completion suggestion.

11. The one or more hardware memory devices of claim 1, wherein the method further comprises providing at least one keyword-based query-completion suggestion.

12. A method performed by a computing device having at least one processor, for providing query-completion suggestions associated with task-oriented user actions, the method comprising:
mining query logs to
A) identify a plurality of task-oriented user actions that ultimately occurred subsequent to accessing search results, and
B) identify correlations between the plurality of task-oriented user actions and one or more search queries that generated the search results, wherein a correlation is based at least on multiple occurrences of a respective task-oriented user action subsequent to accessing search results of a respective search query by multiple users;
identifying a plurality of character sequences, each representing a shortcut to at least one search query that is correlated with one of the plurality of task-oriented user actions; and
based on the identified correlations between the one or more search queries and the plurality of task-oriented user actions, generating an index that maps each of the identified character sequences to one of the search queries correlated with the one of the plurality of task-oriented user actions represented thereby such that upon receipt of one of the plurality of character sequences as at least a portion of a search query, the respective search query correlated with the task-oriented user action in the index is provided as a query-completion suggestion to complete the received search query portion.

13. The method of claim 12, further comprising:
receiving a portion of a user-input search query;
determining that the received portion of the user-input search query is one of the plurality of character sequences that represents a shortcut to at least one query-completion suggestion that is associated with one of the plurality of task-oriented user actions; and
providing the at least one query-completion suggestion as a suggested completion to the portion of the user-input search query.

14. The method of claim 13,
wherein receiving the portion of the user-input search query comprises receiving the portion of the user-input search query portion in association with a query-input region,
and wherein providing the at least one query-completion suggestion comprises providing the at least one query-completion suggestion in association with the query-input region.

15. The method of claim 13, wherein providing the query-completion suggestion comprises providing one or more selectable indicators each of which represents an actionable query-completion selection.

16. The method of claim 15, further comprising:
receiving a user selection of one of the one or more selectable indicators; and,
in response to the user selection of the one of the one or more selectable indicators, navigating the user to a vertical associated with a search engine for furtherance of the associated task-oriented user intent.

17. The method of claim 15, further comprising:
receiving a user selection of one of the one or more selectable indicators; and,
in response to the user selection of the one of the one or more selectable indicators, navigating the user to an external source for furtherance of the associated task-oriented user intent.

18. The method of claim 15, further comprising:
receiving a user selection of one of the one or more selectable indicators; and,
in response to the user selection of the one of the one or more selectable indicators, providing at least one additional selectable indicator which represents an actionable query-completion selection.

19. A system for providing task-oriented query-completion suggestions, the system comprising:
a computing device associated with a search engine having one or more processors and one or more computer-readable storage media; and
a data store coupled with the search engine,
wherein the search engine:
receives at least a portion of a search query in association with a query-input region of a screen display;
mines query log data to determine the received search query portion is suggestive of a user task that is an ultimate intent of the search query, based on a correlation between multiple occurrences of the user task subsequent to user access of search results returned by the search query; and
determines that at least one search query stored in the data store is correlated with the suggested user task that is the ultimate intent of the search query;
provides the correlated at least one search query stored in the data store as at least one query-completion suggestion that is associated with the suggested user task in association with the query-input region.

20. The system of claim 19, wherein mining the query log data to determine the received search query portion is suggestive of the user task comprises mining the query log data to determine that the received search query portion is a shortcut associated with the suggested user task.

* * * * *